United States Patent
Sharoyan et al.

(10) Patent No.: US 11,926,966 B2
(45) Date of Patent: *Mar. 12, 2024

(54) METHOD OF INCREASING EFFICIENCY OF CHEMICAL ADDITIVES IN A PAPERMAKING SYSTEM

(71) Applicant: SOLENIS TECHNOLOGIES, L.P., Wilmington, DE (US)

(72) Inventors: Davit Edward Sharoyan, Wilmington, DE (US); John Charles Harrington, IV, Wilmington, DE (US); Valmir Frauches de Freitas, Wilmington, DE (US); Flávio Henrique Gazzotti Bueno de Oliveira, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/084,895

(22) Filed: Oct. 30, 2020

(65) Prior Publication Data
US 2021/0047780 A1    Feb. 18, 2021

Related U.S. Application Data

(63) Continuation-in-part of application No. 16/149,635, filed on Oct. 2, 2018, now Pat. No. 10,876,254.
(Continued)

(51) Int. Cl.
*D21H 17/45* (2006.01)
*D21H 11/04* (2006.01)
*D21H 11/08* (2006.01)

(52) U.S. Cl.
CPC ........... *D21H 17/455* (2013.01); *D21H 11/04* (2013.01); *D21H 11/08* (2013.01)

(58) Field of Classification Search
None
See application file for complete search history.

(56) References Cited

U.S. PATENT DOCUMENTS 5,167,766 A * 12/1992 Honig .................... D21H 21/54
162/168.3
5,256,252 A    10/1993 Sarkar et al.
(Continued)

FOREIGN PATENT DOCUMENTS

CN    102985613 A    3/2013
CN    103998680 A    8/2014
(Continued)

OTHER PUBLICATIONS

Smook, Gary A., Handbook for Pulp and Paper Technologists, 2nd ed, Angus Wilde Publications, pp. 207-208 (year: 1992).
(Continued)

*Primary Examiner* — Dennis R Cordray
(74) *Attorney, Agent, or Firm* — Christopher S. Andrzejak

(57) ABSTRACT

A method of increasing chemical efficiency of chemical additives in a papermaking system includes the steps of providing thick stock pulp comprising soluble lignin, process water, and at least about 2% by weight of cellulosic fiber based on total weight of thick stock pulp, and adding at least one organic polymer to the thick stock pulp to reduce the amount of soluble lignin therein. The organic polymer is chosen from cationic polymers, non-ionic polymers and combinations thereof.

9 Claims, 10 Drawing Sheets

Table 1

| Treatment | Abs (@ 280 nm) | Lignin (ppm) | % Lignin reduction |
|---|---|---|---|
| No treatment | 0.623 | 404 | |
| Polymer A | 0.433 | 280 | 31 |
| Polymer B | 0.456 | 295 | 27 |
| Polymer C | 0.528 | 342 | 15 |
| Polymer D | 0.583 | 378 | 7 |
| Polymer E | 0.578 | 375 | 7 |
| Polymer F | 0.584 | 379 | 6 |

Related U.S. Application Data

(60) Provisional application No. 62/567,524, filed on Oct. 3, 2017.

(56) References Cited

U.S. PATENT DOCUMENTS

| | | | |
|---|---|---|---|
| 5,578,168 A * | 11/1996 | Burdick | C08L 71/02 162/183 |
| 6,033,524 A * | 3/2000 | Pruszynski | D21H 21/10 162/168.3 |
| 6,083,348 A | 7/2000 | Auhorn et al. | |
| 6,103,065 A * | 8/2000 | Humphreys | D21H 23/18 162/168.3 |
| 6,610,172 B1 | 8/2003 | Lund et al. | |
| 6,939,437 B1 | 9/2005 | Hill, Jr. et al. | |
| 7,807,021 B2 | 10/2010 | Blackstone et al. | |
| 8,454,798 B2 | 6/2013 | Ban et al. | |
| 8,758,562 B2 | 6/2014 | Krapsch et al. | |
| 9,663,899 B2 | 5/2017 | Gu et al. | |
| 2006/0142429 A1* | 6/2006 | Gelman | D21H 21/10 524/505 |
| 2006/0142432 A1* | 6/2006 | Harrington | C08L 53/00 524/505 |
| 2006/0185806 A1* | 8/2006 | Harrington | D21H 17/42 162/158 |
| 2011/0253333 A1 | 10/2011 | Ban et al. | |
| 2012/0202941 A1 | 8/2012 | Broecher et al. | |
| 2012/0291971 A1* | 11/2012 | Sutman | D21H 17/375 525/218 |
| 2014/0116635 A1 | 5/2014 | Porto et al. | |
| 2015/0129148 A1* | 5/2015 | Barton | D21H 21/18 162/164.2 |
| 2016/0289896 A1 | 10/2016 | Hietaniemi et al. | |
| 2017/0218570 A1 | 8/2017 | Gu et al. | |
| 2019/0100875 A1 | 4/2019 | Harrington et al. | |

FOREIGN PATENT DOCUMENTS

| | | |
|---|---|---|
| CN | 108864440 A | 11/2018 |
| EP | 0696663 A1 | 2/1996 |
| EP | 2559768 A1 | 2/2013 |
| WO | 2011130503 A2 | 10/2011 |
| WO | 201363356 A2 | 5/2013 |
| WO | 2014058557 A1 | 4/2014 |
| WO | 2017034774 A1 | 3/2017 |

OTHER PUBLICATIONS

ISA/US, International Search Report and Written Opinion issued in Int. Appl. No. PCT/US2021/072114 dated Mar. 4, 2022.

* cited by examiner

Table 1

| Treatment | Abs (@ 280 nm) | Lignin (ppm) | % Lignin reduction |
|---|---|---|---|
| No treatment | 0.623 | 404 | |
| Polymer A | 0.433 | 280 | 31 |
| Polymer B | 0.456 | 295 | 27 |
| Polymer C | 0.528 | 342 | 15 |
| Polymer D | 0.583 | 378 | 7 |
| Polymer E | 0.578 | 375 | 7 |
| Polymer F | 0.584 | 379 | 6 |

*FIG. 1*

Table 2

| Treatment | Soluble lignin in water, ppm | | |
|---|---|---|---|
| | Treatment 1 | Treatment 2 | Treatment 3 |
| No treatment | 351 | 374 | 426 |
| Polymer A, + 1lbt - cycle 1 | 202 | 269 | |
| Polymer A, + 1lbt - cycle 2 | 106 | 133 | |
| Polymer A, + 1lbt - cycle 3 | 90 | 118 | |
| Polymer A, + 3lbt | | | 159 |

*FIG. 2A*

Table 3

| Thick stock treatment | Abs @ 280 nm | Lignin (ppm) | Lignin red-n | COD (ppm) | % COD red-n |
|---|---|---|---|---|---|
| No treatment | 0.782 | 530.6 | | 4910 | |
| Polymer A, 1.0 lbt | 0.458 | 310.8 | 42% | 4330 | 12% |
| Polymer A, 2.0 lbt | 0.271 | 183.9 | 65% | 4230 | 14% |
| Polymer A, 3.0 lbt | 0.210 | 142.5 | 73% | 3890 | 21% |

Table 4

| Thick stock (4.0%) treatment | Thin stock (0.7%) treatment | Drainage, sec | % Improvement |
|---|---|---|---|
| No treatment | No treatment | 46.93 | |
| No treatment | Polymer D, 1lbt | 44.65 | 4.86 |
| Polymer D, 1lbt | Polymer D, 1lbt | 51.07 | -8.82 |
| Polymer D, 1lbt | Polymer D, 2lbt | 52.2 | -11.23 |
| No treatment | Polymer A, 1lbt | 43.21 | 7.93 |
| Polymer A, 1lbt | Polymer A, 1lbt | 27.07 | 42.32 |
| Polymer A, 1lbt | Polymer A, 2lbt | 20.95 | 55.36 |

*FIG. 4A*

Table 5

| Treatment | Lignin, ppm | % Lignin reduction | Mutek charge (μequ/l) | % Reduction |
|---|---|---|---|---|
| No treatment | 317 | | -430 | |
| Product G, 0.25 kg/ton | 283 | 11 | -340 | 21 |
| Product G, 0.50 kg/ton | 264 | 17 | -315 | 27 |
| Product G, 1.00 kg/ton | 200 | 37 | -270 | 37 |

Table 6a

| Treatment | Lignin, ppm | % Lignin reduction | Turbidity, FTU | %, Turbidity red-n |
|---|---|---|---|---|
| No treatment | 247 | | 45.61 | |
| Product G, 0.25 kg/ton | 210 | 15 | 42.73 | 6 |
| Product G, 0.50 kg/ton | 203 | 18 | 37.65 | 17 |
| Product G, 1.00 kg/ton | 187 | 24 | 22.99 | 34 |

Table 6e

|  | Pré Trial | Trial | % Difference |
|---|---|---|---|
| Conductivity, µS/cm | 2800 | 3500 | 25.0% |
| Pich & Sitickies Dispersant, kg/ton | 2.00 | 0.65 | -67.5% |
| Sizing agent, kg/ton | 5.20 | 3.90 | -25.0% |
| Pulp Production, TPD | 345 | 375 | 8.7% |
| Steam Production, TPD | 55 | 64 | 16.4% |
| Oil Consuption TPD | 24 | 18 | -25.0% |
| PM#01 - HB Lignin | 400 | 150 | -62.5% |
| PM#03 - HB Lignin | 350 | 150 | -57.1% |
| PM#01 - Turbidity NTU | 350 | 250 | -28.6% |
| PM#03 - Turbidity NTU | 400 | 150 | -62.5% |

*FIG. 6E*

continues

METHOD OF INCREASING EFFICIENCY OF CHEMICAL ADDITIVES IN A PAPERMAKING SYSTEM

CROSS-REFERENCE TO RELATED APPLICATIONS

This is a continuation-in-part of U.S. application Ser. No. 16/149,635, filed Oct. 2, 2018, which claims priority to U.S. Provisional Application No. 62/567,524, filed Oct. 3, 2017, and which are all hereby expressly incorporated in their entirety by reference.

FIELD OF THE DISCLOSURE

The present disclosure relates to a method for increasing efficiency of chemical additives in papermaking systems. More specifically, the method manages an amount of soluble lignin in the process water of the pulping and papermaking systems though use of specific polymers.

BACKGROUND

There is a need for papermakers to maximize the efficiency of chemical additives in various systems such as paper mills utilizing virgin pulp, highly or fully closed recycled linerboard mills, minimize fresh water consumption in pulping and papermaking, and minimize the effluent discharge. There is also a need for pulping efficiency increase, e.g. pulp yield increase, brown stock washing efficiency increase, energy efficiency increases in black liquor evaporators and other. The problem with declines in chemical efficiency of additives is universal. The scarcity of fresh water sources and ever increasing costs for fresh water use and effluent discharge drive papermakers in reducing fresh water consumption and recycling process water. Many recycle linerboard (RLB) mills today consume 5 m$^3$ or less fresh water per 1 ton paper produced.

The amounts of dissolved impurities in water can grow exponentially and cause many problems in paper production. The problems include formation of deposits, increase of smell, and high levels of VFA, COD and conductivity. Increased levels of dissolved and colloidal components harm the efficiency of chemical additives e.g. strength, retention and drainage polymers, sizing agents etc. As a result, papermakers have to increase the consumption of chemical additives. However, at some point, an increase in polymer load does not help in reaching the desirable performance, especially in fully closed paper mills.

Virgin linerboard mills though consume more fresh water than those of recycle linerboard mills, still face the same issues with reduced chemical efficiency. In many virgin linerboard mills chemical additives do not function well and in some cases they do not function at all.

Efficiency of chemical additives such as retention and drainage polymers, dry strength agents, sizing agents, and waste water treatment polymers can increase with removal of anionic trash and more specifically with removal of soluble lignin species.

Lignin, in addition to cellulose and hemicellulose, is one of the main constituents of wood. Lignin is a natural, highly aromatic and hydrophobic polymer. For the production of printing grade paper, most of the lignin gets disintegrated and removed from cellulose by Kraft pulping. Additional amounts of lignin are further reduced by series of bleaching and washing stages. However, for production of packaging paper grades, other pulp sources are used. These include virgin pulp, mechanical pulps, semi-chemical mechanical pulps, and recycled fibers such as OCC (old corrugated containers), and the like. These grade pulps may include significant amounts of lignin.

The prior art describes several compositions or applications for the improvements in lignocellulosic paper quality. The prior art deals with residual lignin and/or other contaminants present in the fiber or on the surface of the fiber. However, no prior art addresses issues of soluble lignin in process water and the effects of process water containing high amounts of soluble lignin on papermaking processes. The efficiency of chemical additives will suffer regardless of the presence of contaminants in the fiber if the quality of process water is compromised.

Moreover, the presence of soluble lignin fragments in process water is quite problematic due to the accumulation of significant fractions of low molecular weight lignin species. The smaller soluble lignin fragments present in mill process water do not have enough affinity for cellulose fibers and hence continue to circulate in mill water systems. Accordingly, there remains an opportunity for improvement.

BRIEF SUMMARY

This disclosure addresses the issue of soluble dissolved colloidal lignin in mill process waters via a polymeric approach. This disclosure more specifically provides a method of increasing chemical efficiency of chemical additives in a papermaking system. The method includes the steps of providing thick stock pulp comprising soluble lignin, process water, and at least about 2% by weight of cellulosic fiber based on total weight of thick stock pulp, and adding at least one organic polymer to the thick stock pulp to reduce the amount of soluble lignin therein. Moreover, the organic polymer is chosen from cationic polymers, non-ionic polymers and combinations thereof.

This disclosure also provides an additional method of increasing chemical efficiency of chemical additives in a papermaking system. This method includes the steps of providing thick stock pulp comprising soluble lignin, process water, and at least about 2% by weight of cellulosic fiber based on total weight of thick stock pulp, and adding at least one inorganic coagulant to the thick stock pulp to reduce the amount of soluble lignin therein.

BRIEF DESCRIPTION OF THE DRAWINGS

The present disclosure will hereinafter be described in conjunction with the following drawing figures, wherein like numerals denote like elements, and FIG. 1 is Table 1 referenced in the Examples and showing ABS, lignin ppm, and % lignin reduction as a function of treatment type;

FIG. 2A is Table 2 referenced in the Examples and showing lignin ppm in water as a function of treatment type and number of treatments;

FIG. 4A is Table 4 referenced in the Examples and showing % drainage improvement as a function of thick stock and thin stock treatment and polymer treatment;

FIG. 6E is Table 6e referenced in the Examples and showing various properties measured before and after various experimental trials.

DETAILED DESCRIPTION

Figures 2B, 3:
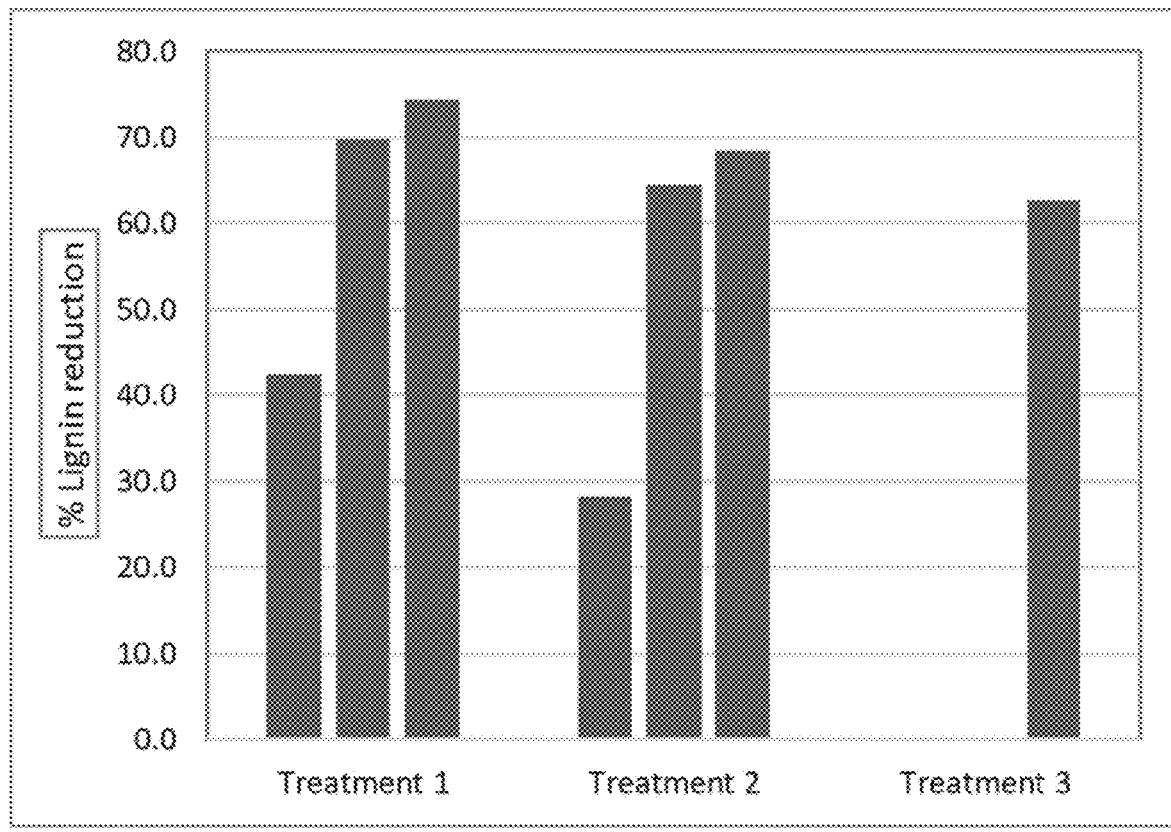
FIG. 2B is a bar graph referenced in the Examples and showing % lignin reduction as a function of treatment type.
FIG. 3 is Table 3 referenced in the Examples and showing ABS, lignin ppm, % lignin reduction, COD ppm, and % COD reduction, as a function of treatment type.

A method of removing soluble lignin in a papermaking system is disclosed. The method allows for an increase in chemical efficiency of papermaking additives including strength additives, retention and drainage polymers, sizing agents and others. In addition, the novel method allows for improvements in pulping sections as well by reductions in water use in brown stock wash. The present disclosure discloses a method for soluble lignin removal from thick stock pulp in papermaking process. The method includes adding a cationic or non-ionic polymer to the thick stock pulp. The method may also include adding and/or an inorganic coagulant a cationic or non-ionic polymer to the thick stock pulp of a papermaking system in highly closed papermaking systems. Lignin reduction from thick stock pulp and its fixation onto fiber results in significant improvements of chemical additives efficiency including those of strength, sizing, retention and drainage agents. In various embodiments, the thick stock pulp includes less than about 5, 4, 3, 2, 1, 0.5, or 0.1, wt %, or is totally free of, an enzyme, e.g. a laccase enzyme or any other enzyme known in the art. Alternatively, the thick stock pulp may include any enzyme known in the art in the amounts set forth above. In various non-limiting embodiments, all values and ranges of values including and between those set forth above are hereby expressly contemplated for use herein.

Lignin reductions and its fixation to the fiber in thick stock may also result in improvements in pulping sections. These improvements could stem from reductions in water use in brown stock washings. These improvements could also include more efficient pulp wash, increased efficiency in black liquor evaporators, increased efficiency in pulping and pulp yield increase.

With increasing degree of water closure, either due to regulatory restrictions or water scarcity, the efficiency of chemical additives declines. The decrease in chemical efficiency, and in some cases a complete lack of performance of polymeric additives, is generally attributed to organic contaminants, loosely defined species in the mill process waters collectively referred to as anionic trash. The anionic trash typically includes of extremely short fibers called fines, degraded starch, degraded or modified chemical additives such as polymers as well as soluble dissolved colloidal lignin. These components affect the performance of chemical additives, in particular cationic polymers, differently. Using a model white water system, based upon the compositional analysis of several commercial recycled paper mills, the applicants investigated the effect of several troublesome components on cationic polymers. Lignin, although not the most prevalent species in mill process waters, showed the most adverse impact on chemical efficiency.

Lignin levels in process water may accumulate in highly closed recycled paper mills. They can also be very high in relatively open virgin mills due to insufficient pulp wash. In either case, lignin levels can be high enough to fully or partially deactivate polymeric additives and hurt their performance.

The disclosure addresses the issue of soluble lignin in thick stock pulp via a polymeric approach. Soluble lignin can be removed from the papermaking process water by a treatment comprising addition of non-ionic and/or cationic polymers to the thick stock pulp. As used herein, the terminology dried furnish solids may be alternatively described as oven dried cellulosic fiber.

The non-ionic polymers useful in the disclosure include, but are not limited to, poly-oxazoline, polyethylene oxide (PEO), copolymers of polyethylene oxide or polypropylene oxide (PO), copolymers of polyethylene oxide and polypropylene oxide (EO/PO), polyvinylpyrrolidone, polyethylenimines (PEI) and/or their combinations. The PEO can be a homo-polymer of ethylene oxide, or a copolymer of ethylene oxide with propylene oxide and/or butylene oxide. A homopolymer of polyethylene oxide is the most typical. Examples of such products are available as dry powder products from Solenis LLC (Wilmington, DE) as Perform PB 8714 and Dow Chemical (Midland, MI) as Ucarfloc 300, 302, 304, and 309. The PEO homopolymer is also available as a slurry, where the PEO is dispersed in a medium. The medium can be any one or more of ethylene glycol, propylene glycol, poly(ethylene glycol), poly(propylene glycol), glycerol, and the like and or their combinations. Examples of a PEO slurry include Zalta MF 3000 from Solenis LLC (Wilmington, DE).

The non-ionic or cationic polymers useful in the present disclosure can be of Formulas I or II or III.

B (Formula I)

B-co-C (Formula II)

C (Formula III)

B represents one or more different nonionic repeat units formed after polymerization of one or more nonionic monomers.

C represents one of more different cationic repeat units formed after polymerization of one or more cationic monomers.

The nonionic polymer segment B in Formulas I and II is a repeat unit formed after polymerization of one or more nonionic monomers. Exemplary monomers encompassed by B which are useful for the present disclosure include, but are not limited to, acrylamide; methacrylamide; N-alkylacrylamides, such as N-methylacrylamide; N,N-dialkylacrylamide, such as N,N-dimethylacrylamide; methyl methacrylate; methyl acrylate; acrylonitrile; N-vinyl methylacetamide; N-vinylformamide; N-vinylmethyl formamide; vinyl acetate; N-vinyl pyrrolidone and mixtures of any of the foregoing. The disclosure contemplates that other types of nonionic monomer can be used, or more than one kind of non-ionic monomer can be used. Preferable nonionic monomers used are acrylamide; methacrylamide, N-vinylformamide.

The cationic polymer segment C in Formula II and III is the repeat unit formed after polymerization of one or more cationic monomers. Exemplary monomers encompassed by C which are useful for the present disclosure include, but are not limited to, cationic ethylenically unsaturated monomers such as the diallyldialkylammonium halides, such as diallyldimethylammonium chloride; the (meth)acrylates of dialkylaminoalkyl compounds, such as dimethylaminoethyl (meth)acrylate, diethylaminoethyl (meth)acrylate, dimethyl aminopropyl (meth)acrylate, 2-hydroxydimethyl aminopropyl (meth)acrylate, aminoethyl (meth)acrylate, and the salts and quaternaries thereof; the N,N-dialkylaminoalkyl(meth) acrylamides, such as N,N-dimethylaminoethylacrylamide, and the salt and quaternaries thereof and mixtures of the foregoing. Most typical are diallyldimethylammonium chloride (DADMAC) and dimethylaminopropyl (meth)acrylamide (DIMAPA), dimethylaminoethyl (meth)acrylate (ADAME) and the salt and quaternaries thereof and mixtures of the foregoing.

Another method to produce the cationic polymer of structure II is by polymerization of the monomer(s) followed by hydrolysis. The level of hydrolysis can be expressed as "% hydrolysis" or "hydrolysis %" on a molar basis. A hydrolyzed polymer can thus be described by as "% hydrolyzed." Moreover the level of hydrolysis can be approximated. For the purposes of applicants' disclosure, a poly (vinylamine) that is referred to as "50% hydrolyzed" means from about 40 to about 60% hydrolyzed. Likewise, a poly (vinylamine) that is about 100% hydrolyzed means from about 80 to about 100% hydrolyzed. The hydrolysis reaction results in the conversion of some or all of the monomer(s) to amines, as controlling the hydrolysis reaction can vary the resultant percentage of monomers having amine functionality. Poly(vinylamine)s are useful in the present disclosure. Examples of monomers used to make a poly(vinylamine) include, but are not limited to, N-vinylformamide, N-vinyl methyl formamide, N-vinylphthalimide, N-vinylsuccinimide, N-vinyl-t-butylcarbamate, N-vinylacetamide, and mixtures of any of the foregoing. Most typical are polymers prepared by the hydrolysis of N-vinylformamide. In the case of copolymers, nonionic monomers, such as those described above, are the typical comonomers. Alternatively, poly(vinylamine) can be prepared by the derivatization of a polymer. Examples of this process include, but are not limited to, the Hofmann reaction of polyacrylamide. It is contemplated that other synthetic routes to a poly(vinylamine) or polyamine can be utilized.

Polymer dispersions such as described in U.S. Pat. No. 7,323,510, which is expressly incorporated herein by reference in various non-limiting embodiments, can be used in the present disclosure. For example, a dispersion containing (i) a high molecular weight cationic polyacrylamide with a weight average molecular weight of greater than about 1,000,000, and (ii) a highly charged (derived from greater than about 50%, typically about 60% cationic monomers) low molecular weight cationic dispersant polymer with a molecular weight of between about 100,000 and about 500,000 can be used in the disclosure. Typical cationic monomers for the components of the dispersion are those listed for polymer segment C. In various non-limiting embodiments, all values and ranges of values including and between those set forth above are hereby expressly contemplated for use herein.

The molar percentage of B:C of nonionic monomer to cationic monomers of Formula II may fall within the range of about 99:1 to about 1:99, or about 80:20 to about 20:80, or about 75:25 to about 25:75 or about 40:60 to about 60:40 or about 99:1 to 50:50, and most typical are about 99:1 to about 90:10 where the molar percentages of B and C add up to about 100%. It is to be understood that more than one kind of nonionic or cationic monomer may be present in Formula II or III. In various non-limiting embodiments, all values and ranges of values including and between those set forth above are hereby expressly contemplated for use herein.

The cationic or non-ionic polymers used in the disclosure can be manufactured and supplied to the end user as a dry or granular powder, an aqueous solution, a dispersion, or an inverse emulsion.

The molecular weight of the cationic or non-ionic polymers can be from about 100,000 to about 10 million Da, typically greater than about 250,000. The molecular weight of the cationic or non-ionic polymers can be from about 400,000 to about 10 million Da. Usually higher molecular weight of non-ionic polymer provides more efficient soluble lignin removal. For instance when using non-ionic polymers or dispersion polymers a molecular weight of about 1 million or greater is typical. For highly charged (greater than 60% cationic monomer) cationic polymers (DADMAC or DIMAPA or EPI-DMA) molecular weight can be from about 100,000 to up to about 1,000,000, or typically from about 200,000 to up to about 500,000. Typically for low charged cationic polymers (10 mole percent or less of cationic monomer) molecular weight can be from about 1,000,000 to up to about 10,000,000 Daltons. In various non-limiting embodiments, all values and ranges of values including and between those set forth above are hereby expressly contemplated for use herein.

The non-ionic or cationic polymer dosage can be from 0.01 lbs to 10 lbs. of polymer solids per ton of oven dried pulp (e.g. dry furnish solids) or about 0.01 to about 10, or about 0.05 to about 5, or about 0.1 to about 3 lbs, or about 0.1 to about 2 lbs. of polymer solids (e.g. active organic polymer) per ton of oven dried pulp (e.g. dry furnish solids). In various non-limiting embodiments, all values and ranges of values including and between those set forth above are hereby expressly contemplated for use herein.

Soluble lignin removal may be further enhanced by combining non-ionic or cationic polymers with addition of inorganic cationic coagulants like polyaluminum chloride, alum (aluminum sulfate), aluminum chlorosulfate, aluminum chlorohydrate, ferric(III) chloride, ferric(III) sulfate, iron (II) chloride, iron (II) sulfate, polyferrous sulfate, any other aluminum or iron based cationic coagulant known to those of skill in the art. Inorganic cationic coagulants addition dosage can be from about 0.01 lb to about 12 lb of dry solids per dried fiber solids, or more specifically from about 0.05 to about 6 lb of dry solids per dried fiber solids. In various non-limiting embodiments, all values and ranges of values including and between those set forth above are hereby expressly contemplated for use herein.

Soluble lignin reductions are accompanied with drop in negative Mutek charge of both lab generated or paper mill process waters. Mutek charge is defined as a surface charge of colloid species in the filtrate. Since soluble lignin is one of significant contributors to negative Mutek charge, soluble lignin reductions are expected to reduce negative Mutek charge of process water by at least about −50 µequ/L, possibly by about −100 µequ/L, or by about −200 µequ/L or more.

Soluble lignin reductions in thick stock pulp by a polymer or polymer combination treatment results in chemical efficiency improvements. These include but not limited to the efficiency of retention and drainage polymers, strength agents, sizing agents and others.

Soluble lignin reductions in thick stock pulp are expected to have benefits not only in chemical efficiency increase but also in the operations of primary clarifiers, anaerobic and aerobic digester plants, on waste water treatment overall due to removal of species which are hard to oxidize and remove by traditional methods of water remediation. Soluble lignin removal and hence chemical efficiency increase is also expected to reduce fresh water use and water closure increase.

Soluble lignin removal is expected to reduce COD (chemical oxygen demand) of process water and COD of waste water stream, including COD fractions which are harder to oxidize (or reduce) and which often require tertiary treatment with the use of oxidizing agents. That in its turn is expected to make waste water treatment more effective and less expensive.

Polymer can be applied to the thick stock pulp or parts of the papermaking where process water is mixed with cellulosic fiber, i.e. in a thin and/or thick stock. The polymers can also be added to the thin stock, where the thick stock is mixed with the process white water at the primary fan pump. Polymer addition points in the thin stock can include, but are not limited to, the inlet or discharge sides of the primary or secondary fan pump, cleaners, or the inlet or discharge of the pressure screen.

However, the best efficiency is achieved by application of a polymer product of a combination of polymer products directly to a thick stock, e.g. blend chest, machine chest. Thick stock pulp may be defined as a mixture of process water and cellulosic fiber with fiber consistency to be about 2% or higher, e.g. from about 2 to about 3, about 3 to about 4, about 2 to about 4, or about 4%. Application of a polymer in a thick stock enables soluble lignin removal onto fiber and thus into finished paper. Thin stock pulp may be defined as a mixture of process water and cellulosic fiber with fiber consistency to be less than about 2%, 1.5%, 1%, or 0.5%. In various non-limiting embodiments, all values and ranges of values including and between those set forth above are hereby expressly contemplated for use herein.

The proposed treatment can be found beneficial for polymer additive efficiency in RLB paper mills which utilize mainly OCC, also virgin mills utilizing unbleached Kraft pulp (UKP), semi-chemical mechanical pulps like neutral sulfite semi-chemical (NSSC), combinations of recycled and virgin pulps (e.g. NSSC/OCC), also deinked pulp (DIP), mechanical pulps like thermal mechanical pulp (TMP), recovered newspaper, recovered tissue or other fiber sources.

Also provided is a method of increasing efficiency of chemical additives in a papermaking system comprising adding at least one polymer and at least one inorganic coagulant, to the thick stock pulp to reduce the amount of soluble lignin in the thick stock pulp.

In various embodiments, the method can provide additional benefits to the pulping sections of papermaking processes, though pulping sections precede the papermaking machine and the suggested soluble lignin treatment in the thick stock. This is because effective lignin management can allow for less condensed and/or fresh water use in brown stock washings and hence result in reductions of condensed and/or fresh water use. In addition, the method may result in higher solids in black liquor from washing processes.

Black liquor volume reductions can also result in less energy spending in black liquor evaporators due to higher organic and inorganic solids in black liquor and lower water usage in brown stock wash. Black liquor evaporation is an energy intensive process. In this process, black liquor is condensed from about 15% solids to about 70% and higher by passing through several black liquor evaporators in which water is removed stepwise by evaporation to steam. Even small increases in % solids of the original black liquor can result in significant energy savings.

Alternatively, the method can also help producing more pulp and/or result in increasing a number of cooks or a cooking efficiency increase because brown stock washing becomes more efficient with lignin fixation and removal in the papermaking section. For example, a pulp yield increase could be about 1% to about 2%, about 3% to about 4%, about 4% to about 6%, about 7% to about 8%, about 9 to about 10% or higher, or from about 1 to about 10, about 2 to about 9, about 3 to about 8, about 4 to about 7, or about 5 to about 6%, depending on the needs of the pulping and papermaking. Due to effective lignin management, the pulping section can have more leverage in cooking pulp to lower the Kappa number value.

In various embodiments, this disclosure describes the use of polymer(s) in the thick stock of a papermaking section, e.g. in a blend chest, machine chest, or stuff box, or via simultaneous application at various points in the papermaking process. However, this method may also be beneficial in application of lignin fixation polymer or polymers in alternative segments of the papermaking or pulping sections. These could include application of lignin fixation polymers to the last stages of brown stock washing, e.g. drum displacement (DD) washing or last stages of a bleach plant, e.g. after extraction stages, or before or after dewatering stages, or in the thin stock of the papermaking process.

In a bleaching plant, after pulp is bleached and washed, it is dewatered (using a decker) and usually stored in a hi density (HiD) storage chest until it is needed by the papermill. The application of lignin fixation and removal polymers could be beneficial if added after the washing but before the dewatering decker since at that point most of the impurities would be removed with washing water. Lignin fixation and removal polymers can also be added after pulp thickening, though the contact time could by significantly higher at that point.

If no bleaching stages are used, then a storage tank of unbleached pulp after brownstock washing and dewatering could be utilized as a location wherein polymer(s) are added for lignin fixation and removal. Alternatively, polymer(s) can be added to the last stages of brownstock washing. This approach also could allow using less water in brownstock washing or shorter time of washing (or both), overall allowing for a pulp production rate increase.

Additional Embodiments

In various embodiments, this provides a method of increasing chemical efficiency of chemical additives in a papermaking system. The method also provides for improvements in a pulping section in the form of increased efficiency in pulp production, increased efficiency in pulp wash and black liquor recycling upon burning in boilers as well as increased steam production. The method includes the steps of providing thick stock pulp comprising soluble lignin, process water, and at least about 2% by weight of cellulosic fiber based on total weight of thick stock pulp, and adding at least one organic polymer to the thick stock pulp to reduce the amount of soluble lignin therein. Moreover, the organic polymer is chosen from cationic polymers, non-ionic polymers and combinations thereof. This method also provides an additional method of increasing chemical efficiency of chemical additives in a papermaking system. This method includes the steps of providing thick stock pulp comprising soluble lignin, process water, and at least about 2% by weight of cellulosic fiber based on total weight of thick stock pulp, and adding at one polymer and at least one inorganic coagulant to the thick stock pulp to reduce the amount of soluble lignin therein.

In one embodiment, the organic polymer is cationic. In another embodiment, the cationic polymer has the general formula II: [B co C—], wherein B represents one or more different nonionic repeat units formed after polymerization of one or more nonionic monomers and C represents one of more different cationic repeat units formed after polymerization of one or more cationic monomers. In another embodiment, the molar percentage of B:C of nonionic monomer to cationic monomer of Formula II is about 99:1 to about 1:99, or about 80:20 to about 20:80, or about 75:25 to about 25:75 or about 40:60 to about 60:40 or about 99:1 to about 50:50. In a further embodiment, the molar percentage of B:C of nonionic monomer to cationic monomer of Formula II is about 99:1 to about 90:10. In still another embodiment, the organic polymer has the general formula II: [C—], wherein C represents one of more different cationic repeat units formed after polymerization of one or more cationic monomers. In a further embodiment, the cationic or non-ionic polymer is chosen from cationic polyacrylamides, polyvinylamines, polyethyleneimines, diallyldimethylammonium chloride polymers, trialkylamminoalkyl (meth)acrylamide polymers, epichlorohydrin-dimethylamine copolymers, polyethyleneoxide polymers, polyethyleneoxide/polypropyleneoxide copolymers, poly-oxazolines and combinations thereof. Alternatively, the cationic polyacrylamides is derived from at least one monomer chosen from diallyldimethylammonium chloride, N,N,N-trialkylamminoalkyl (meth)acrylate, N,N,N-trialkylamminoalkyl (meth)acrylamide, epichlorohydrin-dimethylamine and combinations thereof. Moreover, the cationic polymer may include a polyvinylamine, wherein the polyvinylamine is derived from at least one monomer chosen from N-vinylformamide, N-vinyl methyl formamide, N-vinylphthalimide, N-vinylsuccinimide, N-vinyl-t-butylcarbamate, N-vinylacetamide, and mixtures of any of the foregoing, wherein typically at least one monomer is N-vinylformamide. In another embodiment, the cationic polymer is a polymer dispersion comprising (i) a high molecular weight cationic polyacrylamide and (ii) a low molecular weight highly changed cationic dispersant polymer. In yet another embodiment, the weight average molecular weight of the non-ionic or cationic polymer is from about 100,000 to about 10 million Da and typically about 400,000 to about 10 million Da. Alternatively, the organic polymer is non-ionic. Moreover, the weight average molecular weight of the non-ionic polymer may be from about 400,000 to about 10 million Da and typically about 1,000,000 to about 10,000,000 Da. In various non-limiting embodiments, all values and ranges of values including and between those set forth above are hereby expressly contemplated for use herein.

In other embodiments, the disclosure provides a method of increasing efficiency of chemical additives in a papermaking system comprising adding at least one organic polymer to the thick stock pulp to reduce the amount of soluble lignin in the thick stock pulp; wherein the organic includes polyethyleneoxide polymer with a weight average MW of greater than about 1,000,000 and less than about 10 million daltons. Alternatively, the disclosure provides a method of increasing efficiency of chemical additives in a papermaking system comprising adding at least one organic polymer to the thick stock pulp to reduce the amount of soluble lignin in the thick stock pulp; wherein the organic polymer includes cationic polyacrylamide with a weight average MW of greater than about 200,000 and less than about 10 million daltons. In other embodiments, the organic polymer is added to the thick stock pulp in an amount of from 0.01 lbs to 10 lbs. of polymer solids per ton of oven dried pulp (e.g. dry furnish solids) or about 0.01 to about 10, or about 0.05 to about 5, or about 0.1 to about 3 lbs. of polymer solids (e.g. active organic polymer) per ton of oven dried pulp (e.g. dry furnish solids). In still other embodiments, the at least one organic polymer are added to the thick stock pulp, wherein the thick stock pulp may be a slurry of process water and cellulosic fiber with a consistency of about 2% or higher. Alternatively, the at least one organic polymer and at least one inorganic coagulant are added in a simultaneous or concurrent manner to the thick stock pulp, wherein the thick stock pulp may be defined as a slurry of process water and cellulosic fiber with a consistency of about 2% or higher. In further embodiments, the organic polymer includes a homopolymer. Alternatively, the organic polymer includes a copolymer. In various non-limiting embodiments, all values and ranges of values including and between those set forth above are hereby expressly contemplated for use herein.

In still other embodiments, the removal of soluble lignin is monitored by reduction in absorbance in UV-VIS spectra at about 280 nm and the reduction in absorbance is about 5% or higher after about 24 hours as compared to the system before the laccase and the cationic or non-ionic polymer were added to the thick stock. Alternatively, the thick stock pulp includes a cellulosic fiber source, wherein the cellulosic fiber source is chosen from OCC, deinked pulp, virgin fiber, mechanical pulp, unbleached Kraft pulp or the mixtures thereof. Still further, the thick stock pulp can include a cellulosic fiber source, wherein the cellulosic fiber source includes recycled paper. In other embodiments, at least one chemical additives in the papermaking system is chosen from retention and drainage polymers, strength agents and sizing agents and combinations thereof. In still further embodiments, COD is reduced by at least about 5% in the process water or waste water streams as compared to the COD compared to the system before the cationic or non-ionic polymer or polymer combinations were added to the thick stock. Even further, the method may further include addition of inorganic coagulants to the thick stock. In other embodiments, the inorganic coagulants are chosen from aluminum sulfate, aluminum chloride, aluminum chlorohydrate, polyaluminum chloride, polyaluminum sulfate, iron (III) chloride, iron (III) sulfate iron (II) chloride, iron (II) sulfate, polyferrous sulfate, and combinations thereof. In various non-limiting embodiments, all values and ranges of values including and between those set forth above are hereby expressly contemplated for use herein.

This disclosure also provides a method that includes the steps of providing thick stock pulp comprising soluble lignin, process water, and at least about 2% by weight of cellulosic fiber based on total weight of thick stock pulp, and adding the at least one organic polymer and at least one inorganic coagulant to the thick stock pulp to reduce the amount of soluble lignin therein. In other embodiments, the inorganic cationic coagulant is added to the papermaking system in an amount of from about 0.01 lb to about 12 lb of dry solids per ton of dried fiber solids, or more specifically from about 0.05 to about 6 lb of dry solids per ton of dried fiber solids. In various non-limiting embodiments, all values and ranges of values including and between those set forth above are hereby expressly contemplated for use herein.

In various embodiments, this disclosure provides a method of increasing efficiency of chemical additives in a papermaking system wherein the method includes the step of providing thick stock pulp comprising soluble lignin, process water, and at least about 2% by weight of cellulosic fiber based on total weight of thick stock pulp, and adding at least one organic polymer to the thick stock pulp to reduce the amount of soluble lignin therein. Moreover, the organic polymer is chosen from cationic polymers, non-ionic polymers and combinations thereof. In another embodiment, the thick stock pulp includes at least about 3 or 4% by weight of the cellulosic fibers based on a total weight of the process water. In such embodiments, the cellulosic fibers are derived from NSSC pulp, OCC pulp, deinked pulp, virgin fiber, mechanical pulp, unbleached Kraft pulp or combinations thereof. In a further embodiment, the organic polymer is cationic and has the general formula II: [B-co-C] (II) wherein B is one or more nonionic repeat units formed after polymerization of one or more nonionic monomers, C is one or more different cationic repeat units formed after polymerization of one or more cationic monomers, and -co- is indicative of the polymer being a co-polymer of B and C. In another embodiment, a molar percentage of B:C of the nonionic monomer to the cationic monomer of Formula II is about 75:25 to about 25:75. In still another embodiment, the organic polymer has the general formula III: [—C—] wherein C is one or more different cationic repeat units formed after polymerization of one or more cationic monomers. In a further embodiment, the organic polymer is chosen from cationic polyacrylamides, polyvinylamines, polyethyleneimines, diallyldimethylammonium chloride polymers, trialkylamminoalkyl (meth)acrylamide polymers, epichlorohydrin-dimethylamine copolymers, polyethyleneoxide polymers, polyethyleneoxide-polypropyleneoxide copolymers, poly-oxazolines, and combinations thereof. In still a further embodiment, the cationic polyacrylamides are derived from at least one monomer chosen from diallyldimethylammonium chloride, N,N,N-trialkylamminoalkyl (meth)acrylate, N,N,N-trialkylamminoalkyl (meth) acrylamide, epichlorohydrin-dimethylamine and combinations thereof. In another embodiment, the cationic polymer includes a polyvinylamine derived from at least one monomer chosen from N-vinylformamide, N-vinyl methyl formamide, N-vinylphthalimide, N-vinylsuccinimide, N-vinylt-butylcarbamate, N-vinylacetamide, and combinations thereof. In yet another embodiment, the organic polymer is a polymer dispersion comprising (i) a high molecular weight cationic polyacrylamide having a weight average molecular weight of greater than about 1,000,000 g/mol and (ii) a low molecular weight cationic dispersant polymer derived from greater than about 50 wt % of cationic monomers and having a weight average molecular weight of from about 100,000 to about 500,000 g/mol. In an additional embodiment, the weight average molecular weight of the non-ionic or cationic polymer is from about 100,000 to about 10 million Da. In another embodiment, the organic polymer is non-ionic and has a weight average molecular weight of from about 1,000,000 to about 10,000,000 Da. In another embodiment, the organic polymer is a polyethyleneoxide polymer having a weight average molecular weight of greater than about 1,000,000 and less than about 10 million Da. In a further embodiment, the organic polymer is cationic polyacrylamide having a weight average molecular weight of greater than about 200,000 and less than about 10 million Da. In another embodiment, the organic polymer is added to the thick stock pulp in an amount of from about 0.05 to about 5 pounds of the organic polymer (e.g. active organic polymer) per ton of dried furnish solids, i.e., oven dried cellulosic fiber. In a further embodiment, the reduction in the amount of soluble lignin in the thick stock pulp is evidenced by at least a 5% reduction in absorbance in a UV-VIS spectra measured at about 280 nm after 24 hours as compared to process water that is free of the at least one organic polymer. In another embodiment, the process water exhibits a chemical oxygen demand that is reduced by at least about 5% as compared to the chemical oxygen demand of process water that is free of the at least one organic polymer. In a further embodiment, the method includes the step of adding an inorganic coagulant to the thick stock pulp wherein the inorganic coagulant is chosen from aluminum sulfate, aluminum chloride, aluminum chlorohydrate, polyaluminum chloride, polyaluminum sulfate, iron (III) chloride, iron (III) sulfate, iron (II) chloride, iron (II) sulfate, polyferrous sulfate, and combinations thereof. In various non-limiting embodiments, all values and ranges of values including and between those set forth above are hereby expressly contemplated for use herein.

This disclosure also provides for a method to achieve improvements in pulping section, e.g. increasing pulping yield and efficiency, improvements and energy reductions in black liquor evaporators, reductions in water use in brown stock washing etc. These improvements are reached by providing thick stock pulp comprising soluble lignin, process water, and at least about 2% by weight of cellulosic fiber based on total weight of thick stock pulp, and adding at least one organic polymer to the thick stock pulp to reduce the amount of soluble lignin therein. Moreover, the organic polymer is chosen from cationic polymers, non-ionic polymers and combinations thereof.

In still other embodiments, the method further includes the steps of providing thin stock pulp, and adding the at least one organic polymer to the thin stock pulp simultaneously with the step of adding the at least one organic polymer to the thick stock pulp.

In further embodiments, the method of this disclosure increases pulp yield by at least about 1, 1.5, 2, 2.5, 3, 3.5, 4, 4.5, 5, 5.5, 6, 6.5, 7, 7.5, 8, 8.5, 9, 9.5 or 10% (or greater) as measured in tons of pulp produced per day. For example, because this method is more efficient than other methods, additional pulp can be produced at the front end of the process, i.e., before the step of providing the thick stock pulp. The increase in pulp yield can be determined as compared to a comparative process that does not utilize the at least one organic polymer of this disclosure. In various non-limiting embodiments, all values and ranges of values including and between those set forth above are hereby expressly contemplated for use herein.

In other embodiments, the method further includes the step of providing a black liquor that has a percent solids that is at least 0.5% higher than a comparative method that does not utilize the at least one organic polymer. Said differently, the instant disclosure allows for "dirtier" solutions to be utilized. In various embodiments, the black liquor that can be utilized in this method can have a percent solids that is at least about 0.1, 0.5, 1, 1.5, 2, 2.5, 3, 3.5, 4, 4.5, 5, percent greater (or even more) than a comparative method that does not utilize the at least one organic polymer. This increase in solids means that dirtier black liquor streams can be utilized. This reduces production times, complexities, and costs. In various non-limiting embodiments, all values and ranges of values including and between those set forth above are hereby expressly contemplated for use herein.

EXAMPLES

Polymer products used in this testing are Product A (water dispersion of cationic polyacrylamide, 28% actives), and Product B (25% active polyethylene oxide dispersion product), Product C (40% active, polydadmac based product), Product D (24% active polyethyleneimine), Product E (13% active anionic acrylamide), Product F (20% active amphoteric acrylamide), and Product G (water dispersion of cationic polyacrylamide, 33% actives) all Solenis LLC products. Addition levels of polymers are given in pounds (or kg) of active polymer per ton of dried paper. In the lab setting polymer products are dissolved in water to make 2,500 ppm solutions prior to their additions to process water or stock.

Testing was conducted using thick stock pulp (OCC, UKP, TMP) having a 3.6 to 4% consistency from blend chests of paper machines and white water collected from headbox or a synthetic furnish was made by mixing cellulosic fiber with synthetic white water. The pH of the thick stock and white water samples varied within 6.0 to 7.5.

Synthetic white water used for testing was made by addition of several inorganic components (calcium chloride, sodium sulfate, and sodium acetate) and organic components (anionic starch, soluble lignin, sodium polyacrylate, sodium oleate, acetic acid and galactauronic acid). The conductivity of the resulting mixtures was from 4,700-5,000 uS/cm and pH was from 6.1-6.5. Experiments were conducted on a 250 or 500 g scale with a moderate mixing and temperatures approximately 40-45° C. If OCC (old corrugated containers) of 4% consistency were used as a fiber source, they were refined to 340 C.S.F. freeness before use.

UV-VIS absorbance for all examples was done as follows. After the treatment, fiber slurries were filtered thorough 355 micron sieves and filtrates were diluted 10 fold and analyzed by UV-VIS spectrometry at 280 nm for soluble lignin content. Based on UV-VIS absorbance values % soluble lignin reductions were calculated.

Mutek charge was measured using a Mutek PCD-02 Particle Charge Detector using polydadmac 0.001 mol/L solution as a titrant. Filtrates were diluted 5 fold before Mutek measurements. Turbidity was measured by TD-300 from Hach and reported in FTU units.

Example 1

Unbleached Kraft pulp (UBK) from a paper mill having a 4% consistency was used for the testing. 250 g of pulp samples were placed in a 45° C. bath for thermal equilibration and then were treated with 1 lb/ton of six different polymers individually. These polymers are Polymers A-F described above.

After the samples were stirred for an additional 10 min, they were then removed from the bath, cooled to room temperature, and filtered through a 355 micron sieve. The filtrates were assessed for the lignin content by UV-VIS measurements. % Lignin reduction was calculated vs samples with no treatment. The Lignin values and % lignin reductions are summarized in the Table 1 set forth in FIG. 1.

The testing results indicate that specific polymers are more efficient in lignin fixation and removal from process water (filtrate). The list includes cationic (Polymer A) and non-ionic (Polymer B) polymers. Anionic polymers (Polymer E) or amphoteric polymers (Polymer F) are not efficient in lignin removal from process water.

Example 2

Dewatered OCC fiber and synthetic white water was used in the testing. Cellulose fiber and white water were combined to generate thick stock consistency close to 4%. Thick stock treatment testing was extended into 3 cycles in which 4% consistency stock was treated with 1 lb/ton Polymer A and mixed for 30 min in every cycle and then filtered.

The experiment was implemented in 2 ways: after each cycle white water was isolated form the thick stock cellulosic fiber by gravity filtration. Then filtered white water was re-used in successive steps with fresh pulp (this is represented as Treatment 1 line in Table 2 of FIGS. 2A and 2B) or the same fiber was reused in successive 3 steps (this is represented as Treatment 2 line in Table 2 of FIGS. 2A and 2B). All collected filtrates were analyzed for lignin content. In either case, a gradual reduction in soluble lignin content was observed with final reductions of close to 70%.

Finally, the testing was repeated in 1 step test where thick stock was treated all at ones with 3.0 lb/ton of Polymer A, then thick stock was filtered, and filtrate analyzed for lignin content. Lignin reductions were close to previous runs (this is represented as Treatment 3 in Table 2 of FIGS. 2A and 2B).

These examples illustrate that lignin reductions happen in similar manner regardless if the fresh pulp is used in several steps for lignin fixation and removal or the same pulp is used in one or several steps of lignin removal. In a paper mill setting more gradual (stepwise) reductions in soluble lignin can be expected since "treated" process water can be combined with "not-treated" water for stock dilutions.

Example 3

Synthetic white water was used in this testing. Dewatered OCC fiber was added to white water to generate thick stock consistency close to 4%. Then, 500 g samples were placed in a 45° C. bath for 30 min wherein some samples were not treated, others were treated with 1 lb/ton of Polymer A, 2 lb/ton of Polymer A, or with 3.0 lb/ton Polymer A. After 30 min, all samples were removed from the bath, cooled to room temperature and filtered through a 355 micron sieve. Filtrates were collected and analysed by UV-VIS at 280 nm for soluble lignin determination. Additionally, filtrates were analysed for COD content. The results are summarized in Table 3 of FIG. 3 and indicate that lignin reductions with polymer thick stock treatment translate into additional 12, 14 and 21% reductions in COD content of white water. The example illustrates that effective lignin reductions with polymer treatment result in significant reductions in COD content of process water as well.

Example 4

Thermomechanical (TMP) pulp of 4% consistency was used in the testing below. The TMP stock was split into three parts. The first part was not treated, the second part was treated with 1 lb/ton of Polymer D and the third part was treated with 1 lb/ton of Polymer A. After the treatment thick stock samples were placed in 45° C. warm bath for 30 min. Then the samples were filtered, and filtrates were collected and used in drainage testing.

The drainage activity was determined utilizing a Dynamic Drainage Analyzer, test equipment available from AB Akribi Kemikonsulter, Sundsvall, Sweden. The test device applies a 300 mbar vacuum to the bottom of the separation medium. The device electronically measures the time between the application of vacuum and the vacuum break point, i.e. the time at which the air/water interface passes through the thickening fiber mat. It reports this value as the drainage time. A lower drainage time is typical. 500 ml stock is added to the DDA and the drainage test is conducted at a total instrument vacuum of 300 mbar pressure.

Figure 4B:
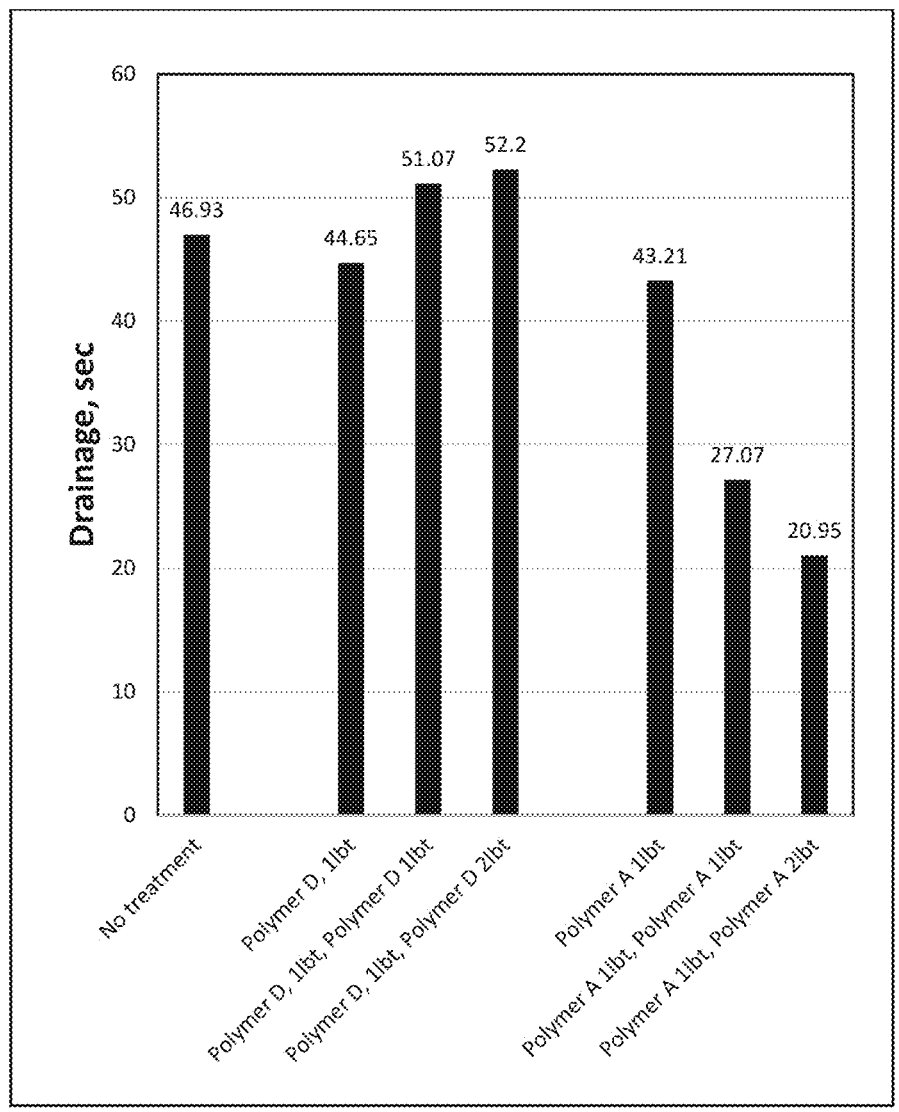
FIG. 4B is a bar graph referenced in the Examples and showing drainage in seconds as a function of treatment.
Figure 4C:
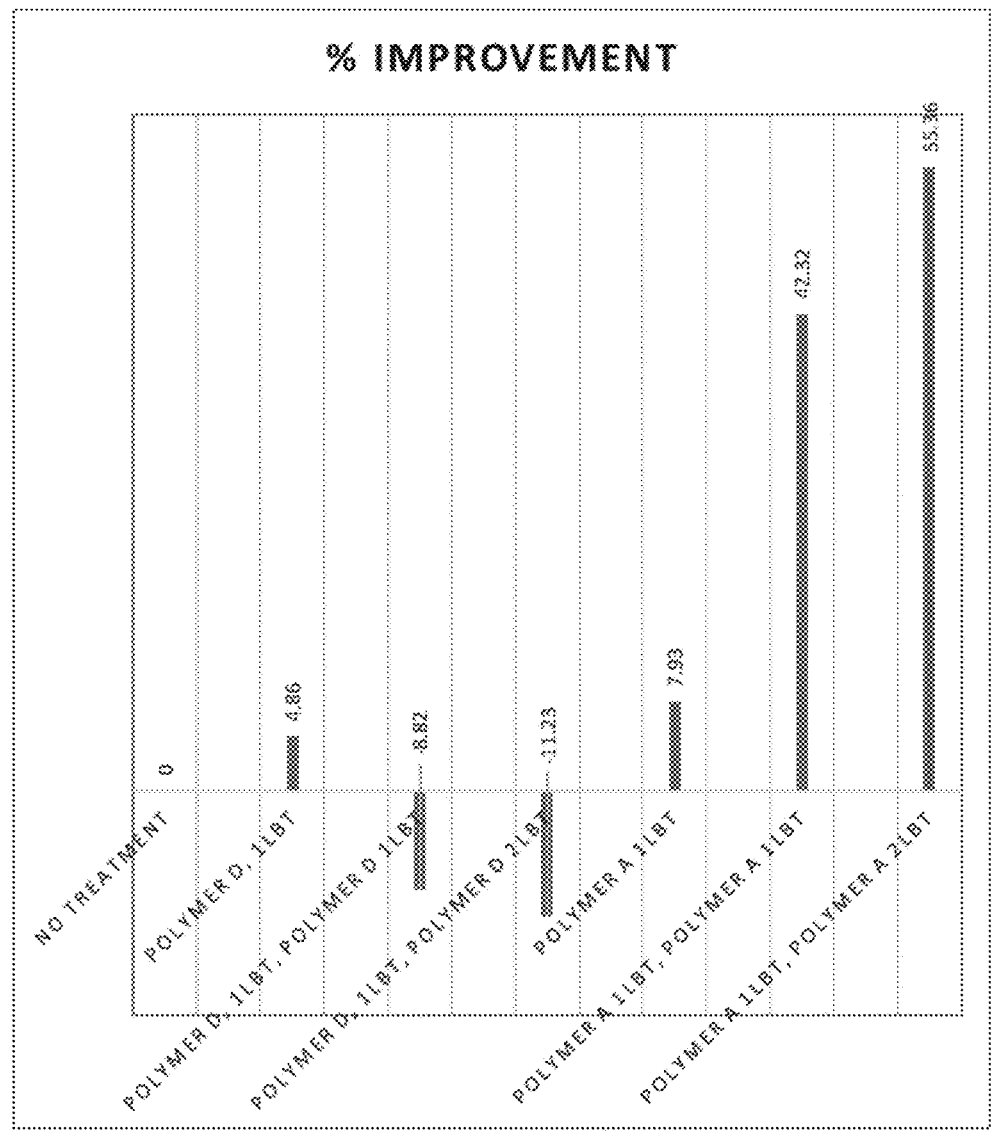
FIG. 4C is a bar graph referenced in the Examples and showing % improvement of drainage polymer efficiency as a function of treatment.

For drainage testing, dewatered TMP fiber (25% consistency) was added to treated or non-treated filtrates to generate fiber/water slurry of 0.7% consistency. Drainage tests were conducted with no drainage aid, with addition of Polymer D at 1 and 2 lb/ton and with addition of Polymer A at 1 and 2 lb/ton. Drainage results (in seconds) as well as % Improvements (for polymer efficiency) are summarized in the Table 4 and the graphs of FIGS. 4A-C. FIG. 4B shows drainage times with thick stock pre-treatments by Polymer D and Polymer A. FIG. 4C shows drainage polymer efficiency increase (%) with thick stock pre-treatments using Polymer D and Polymer A. % Improvement(s) were calculated based on difference between drainage times of non-treated sock and treated stock over the drainage time of non-treated stock using the following formula:

$$\% \text{ Improvement} = \frac{T2 - T1}{T1} \times 100\%,$$

wherein T1 and T2 are drainage times without and with polymer aid, respectively.

Without thick stock pre-treatments, drainage times with Polymer A and Polymer D (43.21 and 44.65 sec, respectively) were very similar to the drainage time of a sample without any additive (46.93 sec). % Improvements (i.e. drainage aid efficiency) of both polymers at 1 lb/ton were quite low, 4.86% and 7.93% respectively.

Thick stock pre-treatment with 1 lb/ton Polymer A followed by addition of Polymer A to thin stock as a drainage aid resulted in drainage time reductions from 43.21 sec down to 27.07 sec (1 lb/ton) and 20.95 sec (2 lb/ton). Overall drainage polymer efficiency improved by 42-55%. However, thick stock pre-treatment with 1 lb/ton Polymer D did not result in drainage time improvements. Drainage times changed from original 44.65 sec to 51.07 sec with addition of 1 lb/ton Polymer D and 52.20 sec with 2 lb/ton. Drainage polymer efficiency declined by 9-11%.

This example illustrates that only specific polymers are efficient in chemical efficiency increase. In this case Polymer A was very efficient in drainage time reductions and drainage polymer efficiency increase.

Example 5

Unbleached Kraft pulp (UBK) of 4% consistency from containerboard mill was treated with Polymer G at 0.25, 0.50, and 1.0 kg/ton. After polymer additions, 500 g thick stock samples were stirred for an additional 20 min at 45° C. and then filtered. Filtrates were analyzed for lignin content and Mutek charge. Lignin and Mutek charge values (in ppm and µequ/l, respectively) as well as Lignin and Mutek charge reductions (in %) are summarized in Table 5 of FIG. 5A. Data indicate that Polymer G product is efficient in lignin reduction and lignin reductions increase with polymer load increase. Since lignin is a major contributor to Mutek charge, effective lignin removal from process water is accompanied with significant reductions in Mutek charge as well.

After lab evaluations lignin management technology was applied in paper mill. In the course of several days Polymer G was added in 1.0 kg/ton dosage to thick stock of containerboard production process utilizing UBK pulp. Addition of Polymer G resulted in lignin reductions up to 30%. Lignin reductions in its turn enabled machine speed increase and allowed for the gradual reduction in strength polymer feed up to 20%. The use of auxiliary anionic polymer was fully eliminated. As a strength polymer, a polyvinylamine based product along with an auxiliary anionic polymer can be used. Machine speed increased while maintaining paper strength (STFI) requirements.

Figures 5A, 5B, 6A:
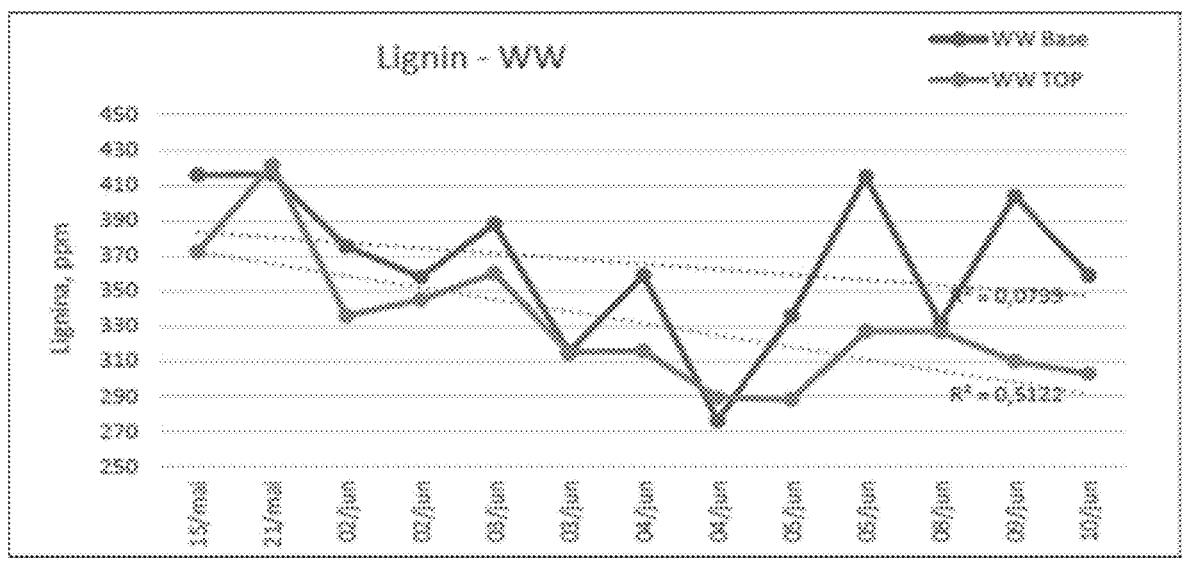
FIG. 5A is a table referenced in the Examples and showing lignin ppm, % lignin reduction, Mutek charge, and % reduction, as a function of treatment.
FIG. 5B is a line graph referenced in the Examples and showing lignin reduction as a function of date of measurement.
FIG. 6A is Table 6a referenced in the Examples and showing lignin ppm, % lignin reduction, turbidity, and % reduction in turbidity, as a function of treatment type.

The graph of FIG. 5B shows the decline in soluble lignin in top ply and base ply white waters. Production consists of two production lines with two Fourdrinier machines, PM #3 and PM #4. In the course of the experiment, Polymer G was added to thick stock consistency pulp of the base ply before the refiner, whereas for the top ply the polymer treatment was added to the thick stock after refiner, right before machine chest. Soluble lignin reduction trends indicate that after refiner addition is more effective than that of before refiner. More specifically, FIG. 5b shows lignin reductions in white water collected from headbox areas of paper machines producing base and top ply for PM #4. This illustrates that even partial reduction in lignin in process water with application of lignin fixation polymer product(s) can result in significant improvement in papermaking: machine speed increase and strength additive efficiency increase.

Example 6

In this example, both lab tests and paper mill trials have been carried out. The lab testing was run using unbleached Kraft pulp (UBK). UBK pulp is produced by batch cooking in pulping section of integrated paper mill. Then it is used by two paper machines PM #1 and PM #3 in the production of packaging paper.

In the lab testing, UKP pulp samples were treated with Polymer G at 0.25, 0.50, and 1.0 kg/ton. After polymer additions 500 g thick stock samples were stirred for an additional 20 min at 45° C. and then filtered. Filtrates were analyzed for lignin content and turbidity. Lignin and turbidity values (in ppm, and FTU units) as well as Lignin and Turbidity reductions (in %) are summarized in Table 6a of FIG. 6A.

Figure 6B:
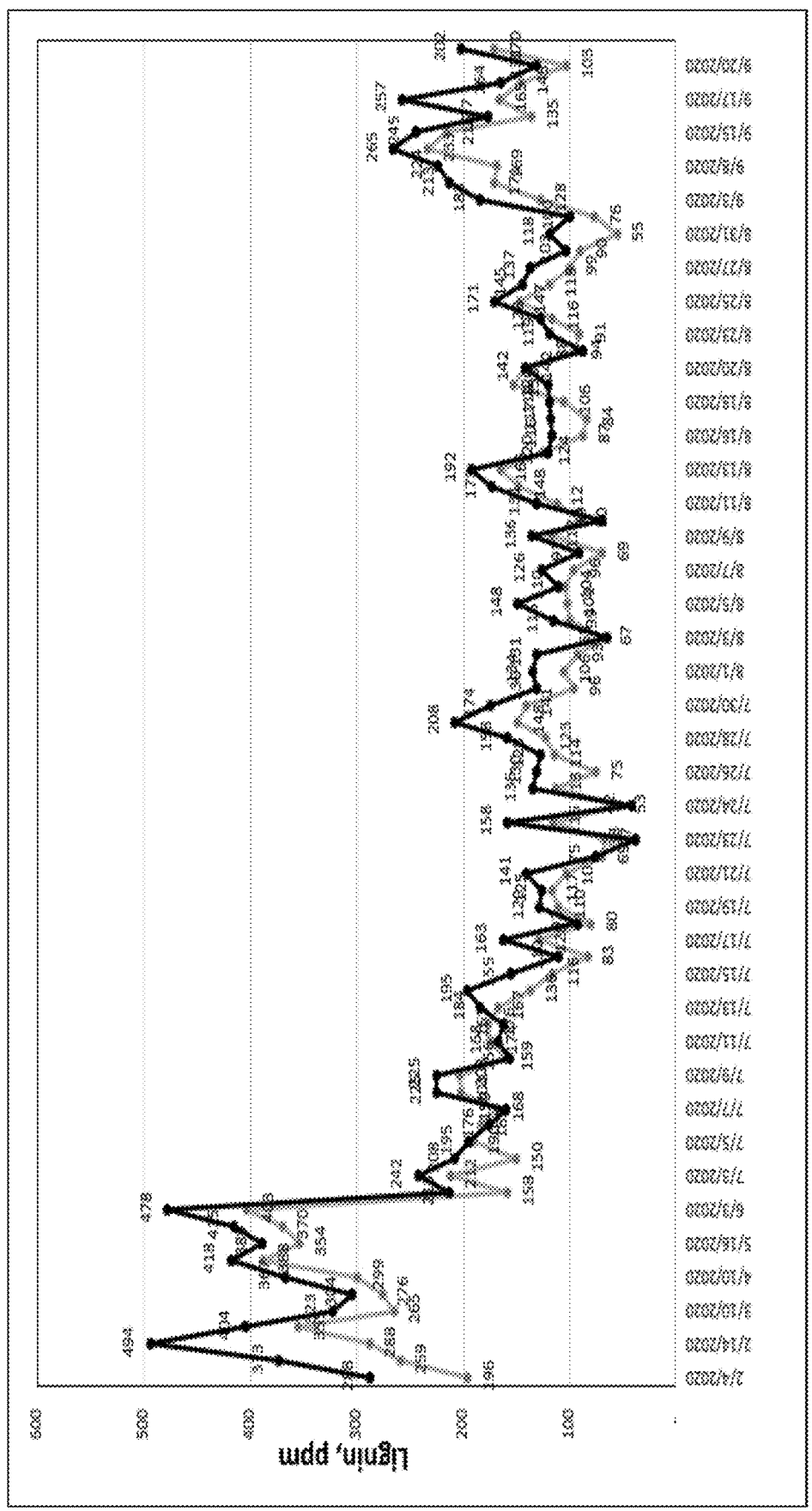
FIG. 6B is a line graph referenced in the Examples and showing lignin reduction as a function of date of measurement.

Lignin management technology was applied to a papermaking process in a paper mill as well. Polymer G was added to thick stock of two paper machines (PM #1 and PM #3) at 0.9-1.2 kg/ton dosage. As a result of polymer treatments significant lignin reductions in process waters of both paper machines have been observed. Graph 6b of FIG. 6B shows lignin reductions on one of the paper machines (PM #1). More specifically, this graph includes a top line representing lignin levels in process water in headbox of paper machine producing base ply and a bottom line that represents shows average lignin levels in process waters in headbox of paper machine producing top ply of two-ply paper production of PM #1. Average lignin levels were close to 400 ppm before the trial (before July) and they dropped to average of 150 ppm (from early July) after addition of Polymer G. Similar lignin reductions were observed on PM #3. Overall, Lignin reductions were close to 62% on PM #1 and 57% on PM #3.

Application of Polymer G to thick stock led to significant reductions in lignin in process water and that allowed for further improvements in papermaking process. Those improvements included significant reductions in Turbidity, 28 to 62% (see Table 6e of FIG. 6E). With lignin reduction, water use in brown stock washing has been reduced by 20%. That change resulted in conductivity increase from 2800 to 3500 µS/cm and higher. This allows for use of lesser amounts of pitch/stickies contaminant control agents (Detac DC786C+Perform DC1871, both Solenis products) by 67% (see, e.g. Graph 6c of FIG. 6C) and for lesser amounts of sizing agent (AKD (alkyl ketene dimer)) by 25% (see, e.g. Graph 6d of FIG. 6D). Overall paper machine runnability improved. Major parameters on strength were in the desired specs.

Figure 6C:
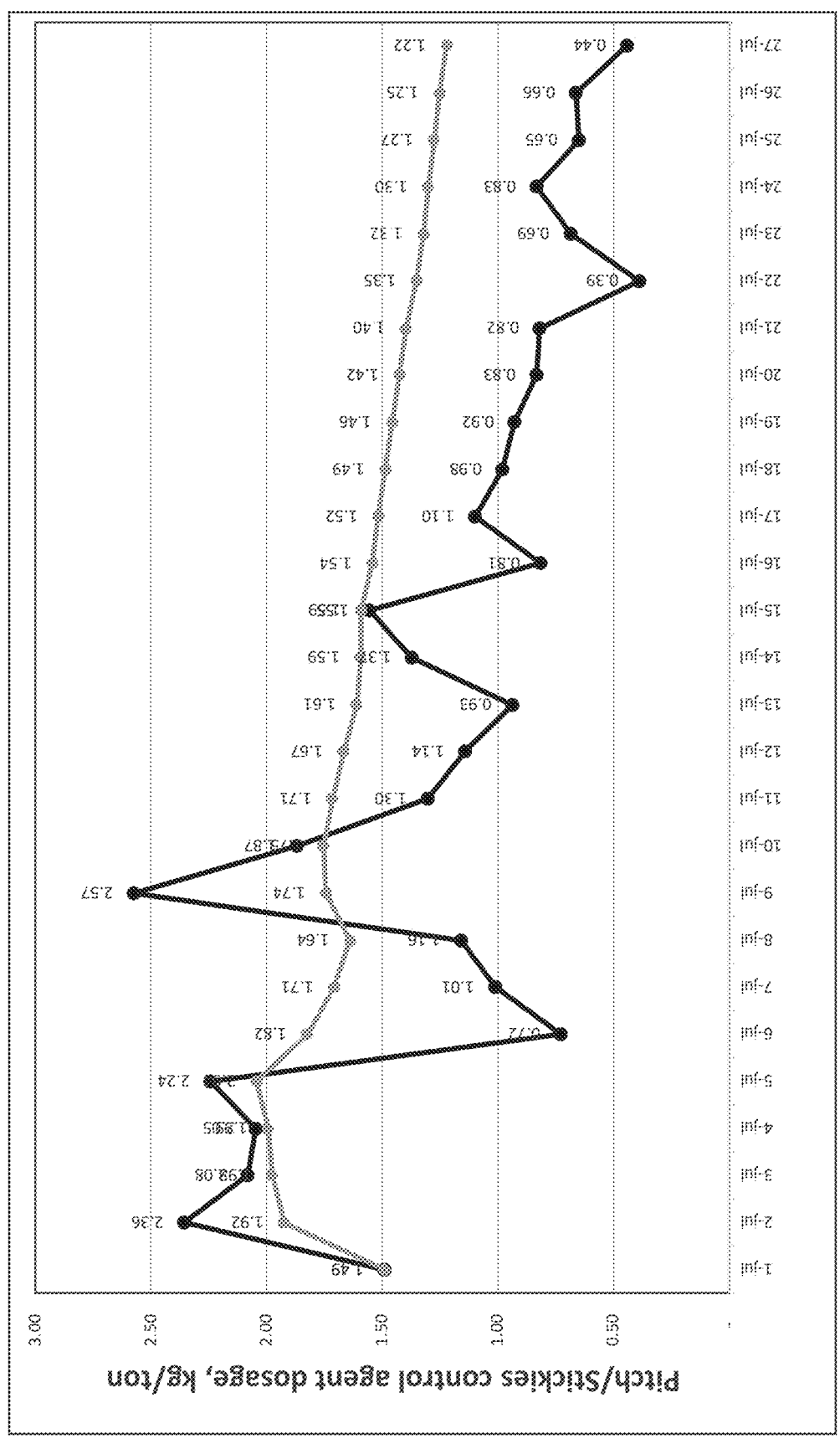
FIG. 6C is a line graph referenced in the Examples and showing pitch control dosage as a function of date of measurement.
Figure 6D:
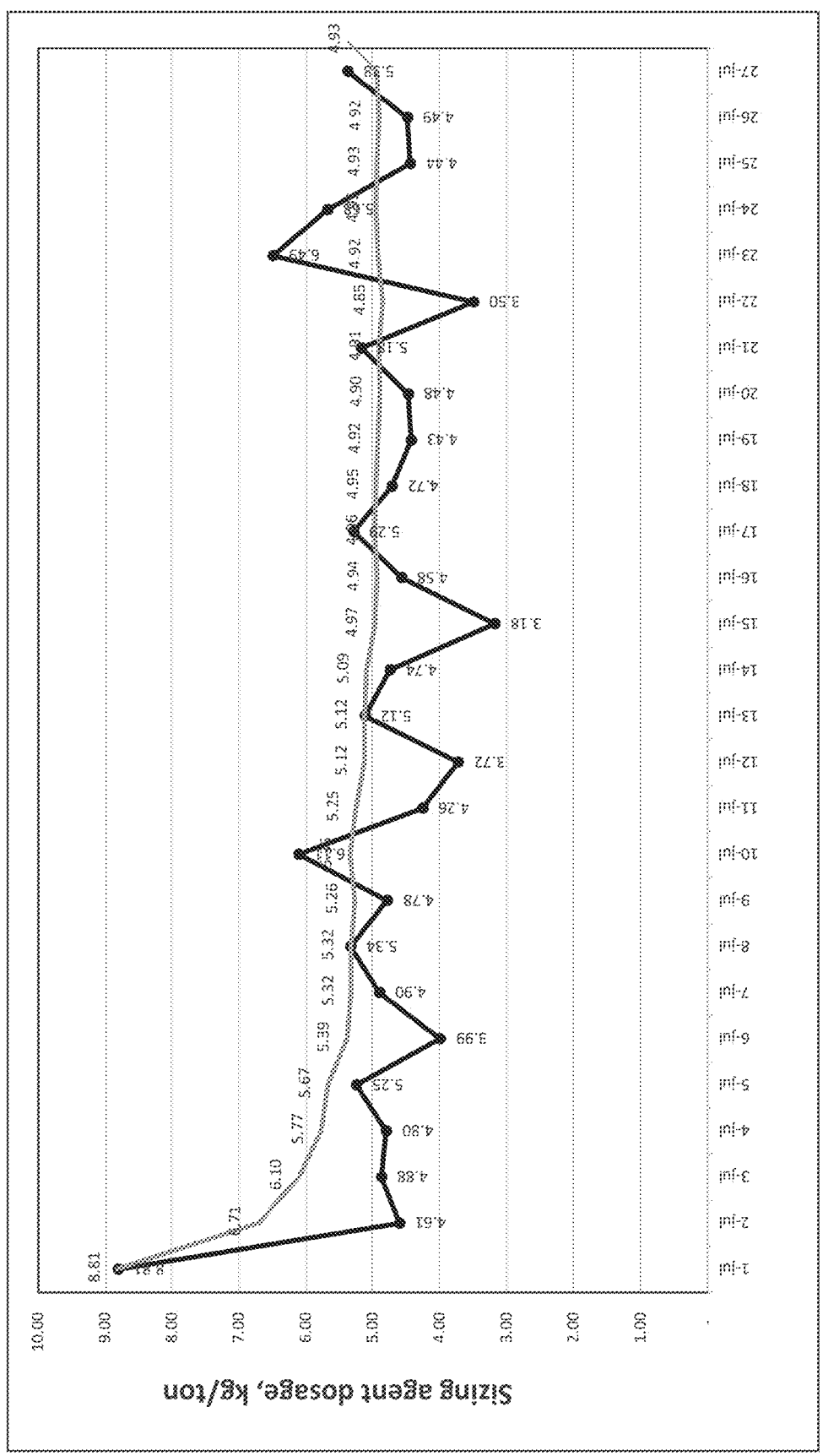
FIG. 6D is a line graph referenced in the Examples and showing sizing agent dosage as a function of date of measurement.

More specifically, graph 6c of FIG. 6C illustrates a decline in use of pitch/stickies control agents (Detac DC786C+Perform DC1871) with effective reduction in lignin content of process water. The top line indicates addition daily average dosages and grey line indicates monthly average values. Moreover, graph 6d of FIG. 6D illustrates a decline in use of AKD (alkyl ketene dimer) sizing agent with effective reduction in lignin content of process water. The top line indicates addition daily average dosages and grey line indicates monthly average values. Table 6e of FIG. 6E illustrates improvements observed in the pulping and papermaking sections with the application of lignin management Polymer G.

In addition to improvements in papermaking section, significant advancements have been achieved in pulping section. Reduction in water use in brown stock washing resulted in reduction black liquor volumes. That in its turn allowed for more wood chips cooks and cellulose production increase, see results in Table 6e. Average amounts of pulp produced per day rose to 8.7%, with the highest value per day reaching to 12%. In addition, reductions in brown stock washing volumes resulted in 1.5% increase in % solids of black liquor. This change resulted in improvements in black liquor evaporators efficiency, steam production increase (16.4%) and oil consumption reductions (25%). Lignin management in papermaking section allowed for cellulosic pulp production increase, energy savings and fresh/condensed water usage reduction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

Moreover, all individual components, method steps, conditions, physical properties, etc. that are described above are hereby expressly contemplated for use together in one or more non-limiting embodiments even though they may not be described together above. In other words, all combinations of the aforementioned components, method steps, conditions, physical properties, etc. are hereby expressly contemplated for use in various non-limiting embodiments.

What is claimed is:

1. A method of increasing chemical efficiency of chemical additives in a papermaking system, said method comprising the steps of:
   providing thick stock pulp comprising soluble lignin, process water, and at least about 2% by weight of cellulosic fiber based on total weight of thick stock pulp, and
   adding at least one organic polymer to the thick stock pulp to reduce the amount of soluble lignin therein; and
   wherein the organic polymer is chosen from water dispersions of cationic polyacrylamides, water dispersions of polyethylene oxides, and combinations thereof,
   wherein the cationic polyacrylamide has a molecular weight of from about 1,000,000 to about 10,000,000 Da,
   wherein the polyethylene oxide has a molecular weight of greater than about 1,000,000 and less than about 10 million Da, and
   wherein the organic polymer is added to the thick stock pulp in an amount of from about 0.05 to about 5 pounds per ton of oven dried pulp.

2. The method of claim 1 wherein the thick stock pulp is free of an enzyme.

3. The method of claim 1 wherein the thick stock pulp comprises at least about 3% by weight of the cellulosic fibers based on a total weight of the thick stock pulp and wherein the cellulosic fibers are derived from NSSC pulp, UBK pulp, OCC pulp, deinked pulp, virgin fiber, mechanical pulp, thermomechanical pulp or combinations thereof.

4. The method of claim 1 wherein the cationic polyacrylamides are derived from at least one monomer chosen from diallyldimethylammonium chloride, N,N-dialkylamminoalkyl (meth)acrylate and quaternaries thereof, N,N-dialkylamminoalkyl (meth) acrylamide and quaternaries thereof, epichlorohydrin-dimethylamine and combinations thereof.

5. The method of claim 1 wherein the reduction in the amount of soluble lignin in the process water is evidenced by at least a 5% reduction in absorbance in a UV-VIS spectra measured at about 280 nm after 24 hours as compared to process water that is free of the at least one organic polymer.

6. The method of claim 1 wherein the process water exhibits a chemical oxygen demand that is reduced by at least about 5% as compared to the chemical oxygen demand of process water that is free of at least one laccase enzyme and the at least one organic polymer.

7. The method of claim 1 further comprising the step of adding an inorganic coagulant to the process water wherein the inorganic coagulant is chosen from aluminum sulfate, aluminum chloride, aluminum chlorohydrate, polyaluminum chloride, polyaluminum sulfate, iron (III) chloride, iron (III) sulfate, iron (II) chloride, iron (II) sulfate, polyferrous sulfate, and combinations thereof.

8. The method of claim 1 further comprising the steps of
   providing thin stock pulp, and
   adding the at least one organic polymer to the thin stock pulp simultaneously with the step of adding the at least one organic polymer to the thick stock pulp.

9. The method of claim 1 that increases a pulp yield production by at least 1% as measured in tons of pulp produced per day.

* * * * *